(12) United States Patent
Gyorfi et al.

(10) Patent No.: US 7,844,229 B2
(45) Date of Patent: Nov. 30, 2010

(54) MOBILE VIRTUAL AND AUGMENTED REALITY SYSTEM

(75) Inventors: Julius S. Gyorfi, Vernon Hills, IL (US); Eric R. Buhrke, Clarendon Hills, IL (US); Juan M. Lopez, Chicago, IL (US); Han Yu, Carpentersville, IL (US)

(73) Assignee: Motorola Mobility, Inc, Libertyville, IL (US)

( * ) Notice: Subject to any disclaimer, the term of this patent is extended or adjusted under 35 U.S.C. 154(b) by 588 days.

(21) Appl. No.: 11/858,997

(22) Filed: Sep. 21, 2007

(65) Prior Publication Data
US 2009/0081959 A1    Mar. 26, 2009

(51) Int. Cl.
H04B 1/00    (2006.01)
H04B 1/38    (2006.01)

(52) U.S. Cl. .................. 455/70; 455/404.2; 455/414.1; 455/414.2; 455/421

(58) Field of Classification Search .............. 455/404.2, 455/414.1, 414.2, 421, 456.1, 456.3, 41.2, 455/466, 70
See application file for complete search history.

(56) References Cited

U.S. PATENT DOCUMENTS

| | | |
|---|---|---|
| 6,317,127 B1 | 11/2001 | Daily et al. |
| 6,377,793 B1 | 4/2002 | Jenkins |
| 6,681,107 B2 | 1/2004 | Jenkins et al. |
| 6,879,835 B2 * | 4/2005 | Greene et al. ............. 455/456.1 |
| 6,917,107 B2 | 7/2005 | Akram |
| 7,042,421 B2 | 5/2006 | Hobgood et al. |
| 7,050,078 B2 | 5/2006 | Dempski |
| 7,113,618 B2 | 9/2006 | Junkins et al. |
| 2002/0102996 A1 * | 8/2002 | Jenkins ........................ 455/456 |
| 2002/0177435 A1 | 11/2002 | Jenkins et al. |
| 2004/0203903 A1 | 10/2004 | Wilson et al. |
| 2005/0099400 A1 | 5/2005 | Lee et al. |
| 2005/0131776 A1 | 6/2005 | Perotti et al. |
| 2005/0289590 A1 | 12/2005 | Cheok et al. |
| 2006/0085419 A1 | 4/2006 | Rosen |

(Continued)

FOREIGN PATENT DOCUMENTS

JP    2003-303356 A    10/2003

(Continued)

OTHER PUBLICATIONS

Lim, et al., "My Virtual Graffiti System," IEEE International Conference on Multimedia and Expo, pp. 847-850, 2004.

(Continued)

Primary Examiner—Tuan A Pham

(57) ABSTRACT

A method and apparatus for messaging within a mobile virtual and augmented reality system is provided herein. During operation a user can create "virtual graffiti" that will be left for a particular device to view as part of an augmented reality scene. The virtual graffiti will be assigned to a particular physical location or a part of an object that can be mobile. The virtual graffiti is then uploaded to a network server, along with the location and individuals who are able to view the graffiti as part of an augmented reality scene. When a device that is allowed to view the graffiti is near the location, the graffiti will be downloaded to the device and displayed as part of an augmented reality scene.

6 Claims, 8 Drawing Sheets

U.S. PATENT DOCUMENTS

| | | | |
|---|---|---|---|
| 2006/0241859 A1 | 10/2006 | Kimchi et al. | |
| 2006/0277474 A1 | 12/2006 | Robarts et al. | |
| 2007/0024527 A1 | 2/2007 | Heikkinen et al. | |
| 2007/0032244 A1 | 2/2007 | Counts et al. | |
| 2007/0038944 A1 | 2/2007 | Carignano et al. | |
| 2007/0043828 A1 | 2/2007 | Famolari et al. | |
| 2008/0122871 A1* | 5/2008 | Guday | 345/634 |

FOREIGN PATENT DOCUMENTS

| | | |
|---|---|---|
| JP | 2006-313549 A | 11/2006 |
| KR | 10-2002-0043589 A | 6/2002 |
| KR | 10-2005-0055506 A | 6/2005 |
| KR | 10-2005-0078136 A | 8/2005 |
| KR | 10-2006-0057150 A | 5/2006 |
| KR | 10-2008-0022983 A | 3/2008 |
| WO | WO 01-24067 A1 | 4/2001 |

OTHER PUBLICATIONS

Hughes, "Experimental Wireless Art Project Enables Virtual Graffiti," University of Georgia Research, http://tagging.us/html/pr.html, downloaded Mar. 14, 2008.

Singh, et al., "Augmented Reality Post-It System," ACM SIGCHI International Conference on Advances in Computer Entertainment Technology, 2004.

Garner, et al., "The Mobile Phone as Digital SprayCan," ACM SIGCHI International Conference on Advances in Computer Entertainment Technology, 2006.

Simon, et al., "Towards Orientation-Aware Location Based Mobile Services," Third Symposium on LBS and Telecartgraphy, Vienna, Austria, Nov. 28-30, 2005.

Jonietz, "TR10: Augmented Reality; Markus Kahari Wants to Superimpose Digital Information on the Real World," MIT Technology Review, Mar. 12, 2007.

Nokia, "Nokia Research Project: MARA," http://research.nokia.com/research/projects/mara/index.html, downloaded Mar. 14, 2008.

Rekimoto, et al., "Augment-able Reality: Situated Communication through Digital and Physical Spaces," IEEE 2nd International Symposium on Wearable Computers, pp. 68-75, 1998.

Rekimoto, "Transvision: A Hand-Held Augmented Reality System for Collaborative Design," International Conference on Virtual Systems and Multimedia, pp. 85-90, 1996.

Sang Min Lee, "PCT International Search Report and Written Opinion," WIPO, ISA/KR, Korean Intellectual Property Office, Daejeon, Republic of Korea, Mar. 24, 2009.

Ross Mayfield, "Augmented Moblogging," Ross Mayfield's Weblog: Markets, Technology and Musings, http:/radio.weblogs.com, Jan. 28, 2003 pp. 1-6.

Olga Kharif, "Social Networking Goes Mobile," Business Week Online, www.businessweek.com, May 31, 2006, pp. 1-2.

* cited by examiner

100

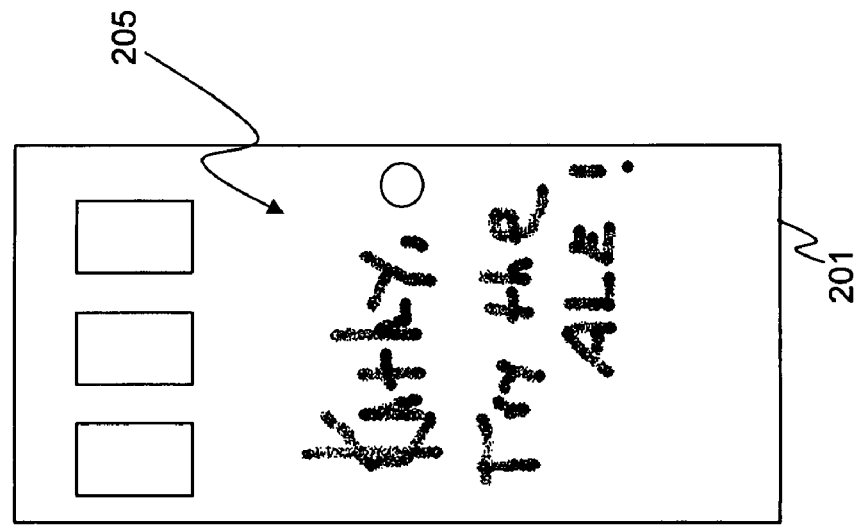
Real-world door having Virtual graffiti upon it
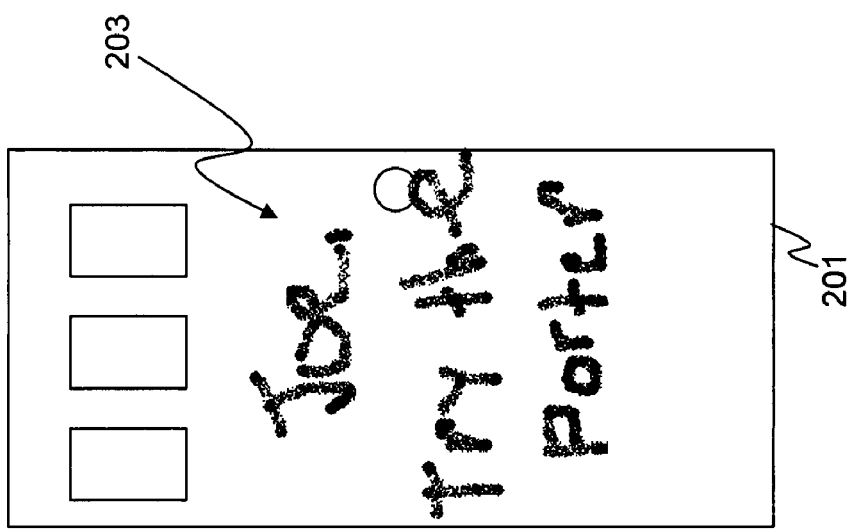
Real-world door having Virtual graffiti upon it
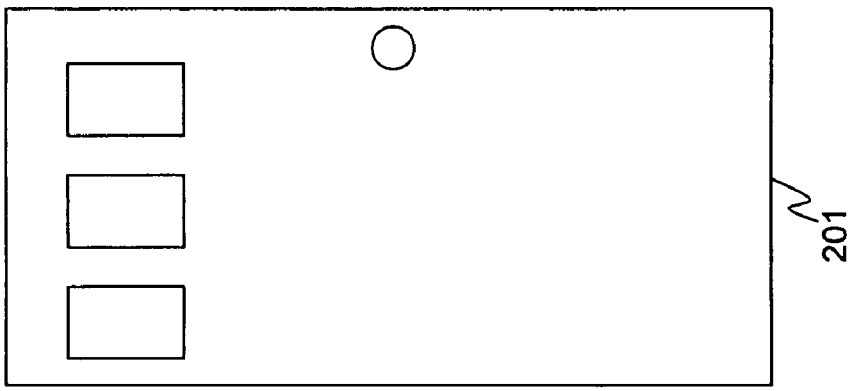
Real-world door
FIG. 2

101

105, 107, 109

MOBILE VIRTUAL AND AUGMENTED REALITY SYSTEM

FIELD OF THE INVENTION

The present invention relates generally to messaging, and in particular, to messaging within a mobile virtual and augmented reality system.

RELATED APPLICATIONS

This application is related to application Ser. No. 11/844,538, entitled MOBILE VIRTUAL AND AUGMENTED REALITY SYSTEM, filed Aug.24, 2007.

BACKGROUND OF THE INVENTION

Messaging systems have been used for years to let users send and receive messages to each other. Currently, one of the simplest ways to send a message to another individual is to simply send a text message to the individual's cellular phone. Recently, it has been proposed to expand the capabilities of messaging systems so that subscribers of the network may be given the option of leaving a specific message at a particular location. For example, in U.S. Pat. No. 6,681,107B2, SYSTEM AND METHOD OF ACCESSING AND RECORDING MESSAGES AT COORDINATE WAY POINTS, the author proposes that a subscriber can merely push a button at a specific location causing the device to save the physical location. Then he can push a "record message" button which allows him to speak a message into his device. This message could be directions to the subscriber's house from the specific location or any other personal message. The message is then uploaded to the network where it will become available to other network subscribers. The person creating the message can designate whether the message is available to all subscribers, only the persons stored in the memory of the Subscriber's device, a subset of the persons stored in memory, or even a single person.

In order to enhance the user's experience with the above-type of context-aware messaging system, the types of information provided to the users must go beyond simple text, images, and video. Therefore, a need exists for a method and apparatus for messaging within a context-aware messaging system that enhances the user's experience.

BRIEF DESCRIPTION OF THE DRAWINGS

FIG. 2 illustrates an augmented reality scene.

DETAILED DESCRIPTION OF THE DRAWINGS

Figure 1:
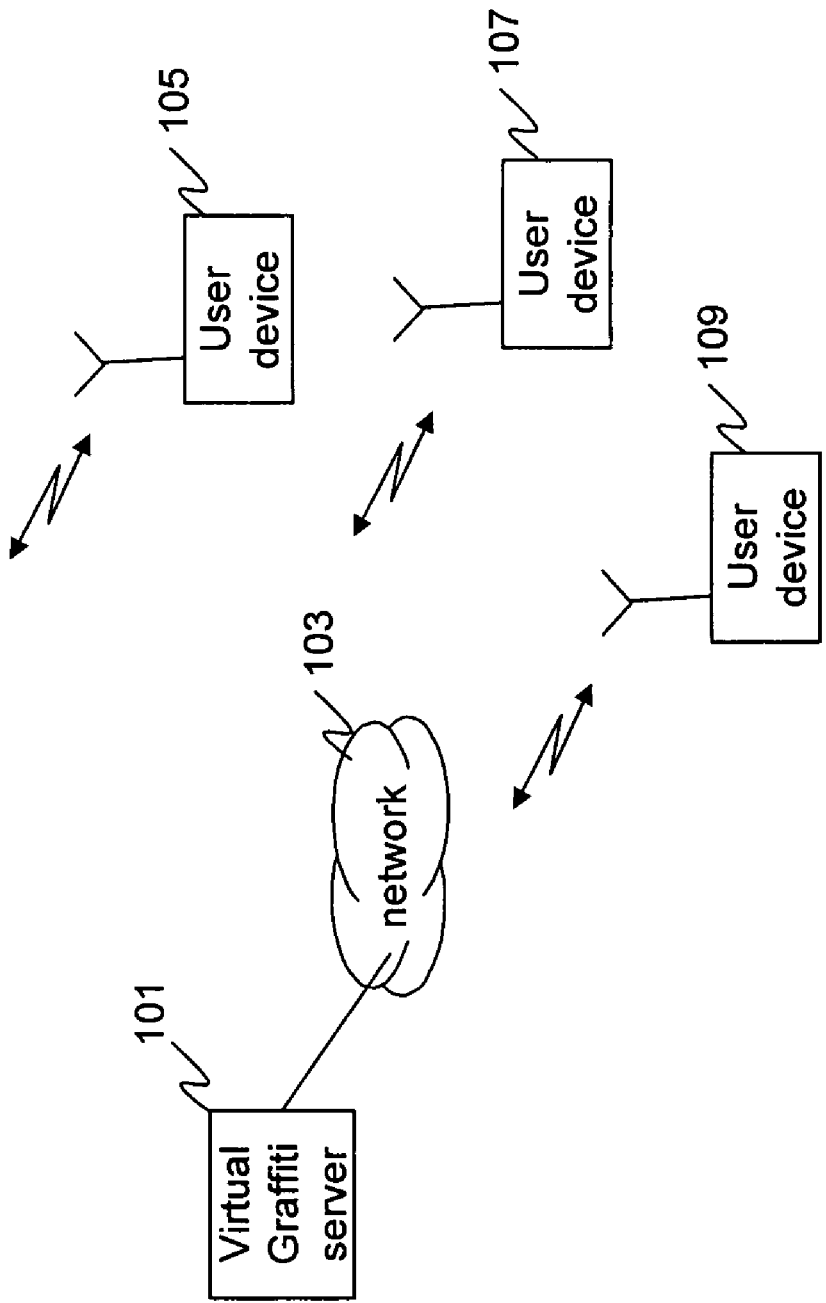
FIG. 1 is a block diagram of a context-aware messaging system.

In order to address the above-mentioned need, a method and apparatus for messaging within a mobile virtual and augmented reality system is provided herein. During operation a user can create "virtual graffiti" that will be left for a particular device to view as part of an augmented reality scene. The virtual graffiti will be assigned to either a particular physical location or a part of an object that can be mobile. The virtual graffiti is then uploaded to a network server, along with the location and individuals who are able to view the graffiti as part of an augmented reality scene. When a device that is allowed to view the graffiti is near the location, the graffiti will be downloaded to the device and displayed as part of an augmented reality scene.

In an augmented reality system, computer generated images, or "virtual images" may be embedded in or merged with the user's view of the real-world environment to enhance the user's interactions with, or perception of the environment. In the present invention, the user's augmented reality system merges any virtual graffiti messages with the user's view of the real world.

As an example, a first user may wish to leave a message for a second user to try a particular menu item at a restaurant. The message may be virtually written on the door of the restaurant, and left for the second user to view. When the second user visits the restaurant, they will receive an indication that virtual graffiti is available for them to view. The message will then appear to the second user on the door of the restaurant when viewed with the second user's augmented reality system. In a similar manner, the user may wish to leave a message for himself.

In another example, an augmented reality display can be seen providing information on an individual being viewed, such as name, age, occupation, marital status, etc. The individual's appearance can even be altered. Thus, users will be able to customize how they are seen in augmented reality scenes. For instance, they could choose to use avatars or any graphical image that represents them, or they could choose their favorite photo to name just two possibilities.

The present invention encompasses apparatus comprising a global object manager wirelessly receiving from a first device, virtual graffiti, the location of the first device, and a list of devices with privileges to view the virtual graffiti, a database storing the virtual graffiti, the location of the first device, and the list of devices with privileges to view the virtual graffiti, a personal object manager periodically receiving locations from the devices with privileges to view the virtual graffiti, periodically receiving a location of the first device, and determining that a second device is near the location of the first device, wherein the second device is on the list of devices with privileges to view the virtual graffiti, and a transmitter wirelessly providing the second device with the virtual graffiti when the second device is near the location of the first device.

The present invention additionally encompasses a method comprising the steps of wirelessly receiving from a first device, virtual graffiti, the location of the first device, and a list of devices with privileges to view the virtual graffiti, storing the virtual graffiti, the location of the first device, and the list of devices with privileges to view the virtual graffiti, and periodically receiving locations from the devices with privileges to view the virtual graffiti. Locations for the first device are periodically received and a determination is made that a second device is near the location of the first device, wherein the second device is on the list of devices with privileges to view the virtual graffiti. Finally, the second device is wirelessly provided with the virtual graffiti when the second device is near the location of the first device.

Turning now to the drawings, wherein like numerals designate like components, FIG. 1 is a block diagram of context-aware messaging system 100. System 100 comprises virtual graffiti server 101, network 103, and user devices 105-109. In one embodiment of the present invention, network 103 comprises a next-generation cellular network, capable of high data rates. Such systems include the enhanced Evolved Universal Terrestrial Radio Access (UTRA) or the Evolved Universal Terrestrial Radio Access Network (UTRAN) (also known as EUTRA and EUTRAN) within 3GPP, along with evolutions of communication systems within other technical specification generating organizations (such as Phase 2within 3GPP2, and evolutions of IEEE 802.11, 802.16, 802.20, and 802.22). User devices 105-109 comprise devices capable of real-world imaging and providing the user with the real-world image augmented with virtual graffiti.

During operation, a user (e.g., a user operating user device 105) determines that he wishes to send another user virtual graffiti as part of an augmented reality scene. User device 105 is then utilized to create the virtual graffiti and associate the virtual graffiti with a location. The user also provides device 105 with a list of user(s) (e.g., user 107) that will be allowed to view the virtual graffiti. Device 105 then utilizes network 103 to provide this information to virtual graffiti server 101.

Server 101 periodically monitors the locations of all devices 105-109 along with their identities, and when a particular device is near a location where it is to be provided with virtual graffiti, server 101 utilizes network 103 to provide this information to the device. When a particular device is near a location where virtual graffiti is available for viewing, the device will notify the user, for example, by beeping. The user can then use the device to view the virtual graffiti as part of an augmented reality scene. Particularly, the virtual graffiti will be embedded in or merged with the user's view of the real-world. It should be noted that in alternate embodiments, no notification is sent to the user. It would then be up to the user to find any virtual graffiti in his environment.

FIG. 2 illustrates an augmented reality scene. In this example, a user has created virtual graffiti 203 that states, "Joe, try the porter" and has attached this graffiti to the location of a door. As is shown in FIG. 2, the real-world door 201 does not have the graffiti existing upon it. However, if a user has privileges to view the virtual graffiti, then their augmented reality viewing system will show door 201 having graffiti 203 upon it. Thus, as is obvious, the virtual graffiti is not available to all users of system 100. The graffiti is only available to those designated able to view it (preferably by the individual who created the graffiti). Thus, each device 105-109 will provide a unique augmented reality scene to their user. For example, a first user may view a first augmented reality scene, while a second user may view a totally different augmented reality scene. This is illustrated in FIG. 2 with graffiti 205 being different than graffiti 203. Thus, a first user, looking at door 201 may view graffiti 203, while a second user, looking at the same door 201 may view graffiti 205.

Although the above example was given with virtual graffiti 203 displayed on a particular object (i.e., door 201), in alternate embodiments of the present invention, virtual graffiti may be displayed not attached to any object. For example, graffiti may be displayed as floating in the air, or simply in front of a person's field of view.

As is evident, for any particular device 105-109 to be able to display virtual graffiti attached to a particular object, a node must be capable of identifying the object's location, and then displaying the graffiti at the object's location. There are several methods for accomplishing this task. In one embodiment of the present invention, this is accomplished via the technique described in US2007/0024527, METHOD AND DEVICE FOR AUGMENTED REALITY MESSAGE HIDING AND REVEALING by the augmented reality system using vision recognition to attempt to match the originally created virtual graffiti to the user's current environment. For example, the virtual graffiti created by a user may be uploaded to server 101 along with an image of the graffiti's surroundings. The image of the graffiti's surroundings along with the graffiti can be downloaded to a user's augmented reality system, and when a user's surroundings match the image of the graffiti's surroundings, the graffiti will be appropriately displayed.

In another embodiment of the present invention the attachment of the virtual graffiti to a physical object is accomplished by assigning the physical coordinates of the physical object (assumed to be GPS, but could be some other system) to the virtual graffiti. The physical coordinates must be converted into virtual coordinates used by the 3D rendering system that will generate the augmented reality scene (one such 3D rendering system is the Java Mobile 3D Graphics, or M3G, API specifically designed for use on mobile devices.) The most expedient way to accomplish the coordinate conversion is to set the virtual x coordinate to the longitude, the virtual y coordinate to the latitude, and the virtual z coordinate to the altitude thus duplicating the physical world in the virtual world by placing the origin of the virtual coordinate system at the center of the earth so that the point (0,0,0) would correspond the point where the equator and the prime meridian cross, projected onto the center of the earth. This would also conveniently eliminate the need to perform computationally expensive transformations from physical coordinates to virtual coordinates each time a virtual graffiti message is processed.

As previously mentioned, the physical coordinate system is assumed to be GPS, but GPS may not always be available (e.g., inside buildings). In such cases, any other suitable location system can be substituted, such as, for example, a WiFi-based indoor location system. Such a system could provide a location offset $(x_o, y_o, z_o)$ from a fixed reference point $(x_r, y_r, z_r)$ whose GPS coordinates are known. Whatever coordinate system is chosen, the resultant coordinates will always be transformable into any other coordinate system.

After obtaining the virtual coordinates of the virtual graffiti, a viewpoint must be established for the 3D rendering system to be able to render the virtual scene. The viewpoint must also be specified in virtual coordinates and is completely dependent upon the physical position and orientation (i.e., viewing direction) of the device. If the viewpoint faces the virtual graffiti, the user will see the virtual graffiti from the viewpoint's perspective. If the user moves toward the virtual graffiti, the virtual graffiti will appear to increase in size. If the user turns 180 degrees in place to face away from the virtual graffiti, the virtual graffiti will no longer be visible and will not be displayed. All of these visual changes are automatically handled by the 3D rendering system based on the viewpoint.

Given a virtual scene containing virtual graffiti (at the specified virtual coordinates) and a viewpoint, the 3D rendering system can produce a view of the virtual scene unique to the user. This virtual scene must be overlaid onto a view of the real world to produce an augmented reality scene. One method to overlay the virtual scene onto a view of the real world from the mobile device's camera is to make use of the M3G background object which allows any image to be placed behind the virtual scene as its background. Using the M3G background, continuously updated frames from the camera can be placed behind the virtual scene, thus making the scene appear to be overlaid on the camera output.

Given the above information, when a user views virtual graffiti, the device's location is determined and sent to the server. The server determines what messages, if any, are in proximity to and available for the user. These messages are then downloaded by the user and processed. The processing involves transforming the physical locations of the virtual messages into virtual coordinates. The messages are then placed at those virtual coordinates. At the same time, the device's position and its orientation are used to define a viewpoint into the virtual world also in virtual coordinates. If the downloaded virtual message is visible from the given viewpoint, it is rendered on a mobile device's display on top of live video of the scene from the device's camera.

Thus, if the user wants to place a virtual message on the top of an object, the user must identify the location of the point on top of the object where the message will be left. In the simplest case, the user can place his device on the object and capture the location. He then sends this location with the virtual object and its associated content (e.g., a beer stein with the text message "try the porter" applied to the southward-facing side of the stein) to the server. The user further specifies that the message be available for a particular user. When the particular user arrives at the bar and is within range of the message, he will see the message from his location (and, therefore, his viewpoint). If he is looking toward the eastward-facing side of the message, he will see the stein, but will just be able to tell that there is some text message on the southern side. If a user wishes to read the text message, he will have to move his device (and thus his viewpoint) so that it is facing the southern side of the stein.

Figure 3:
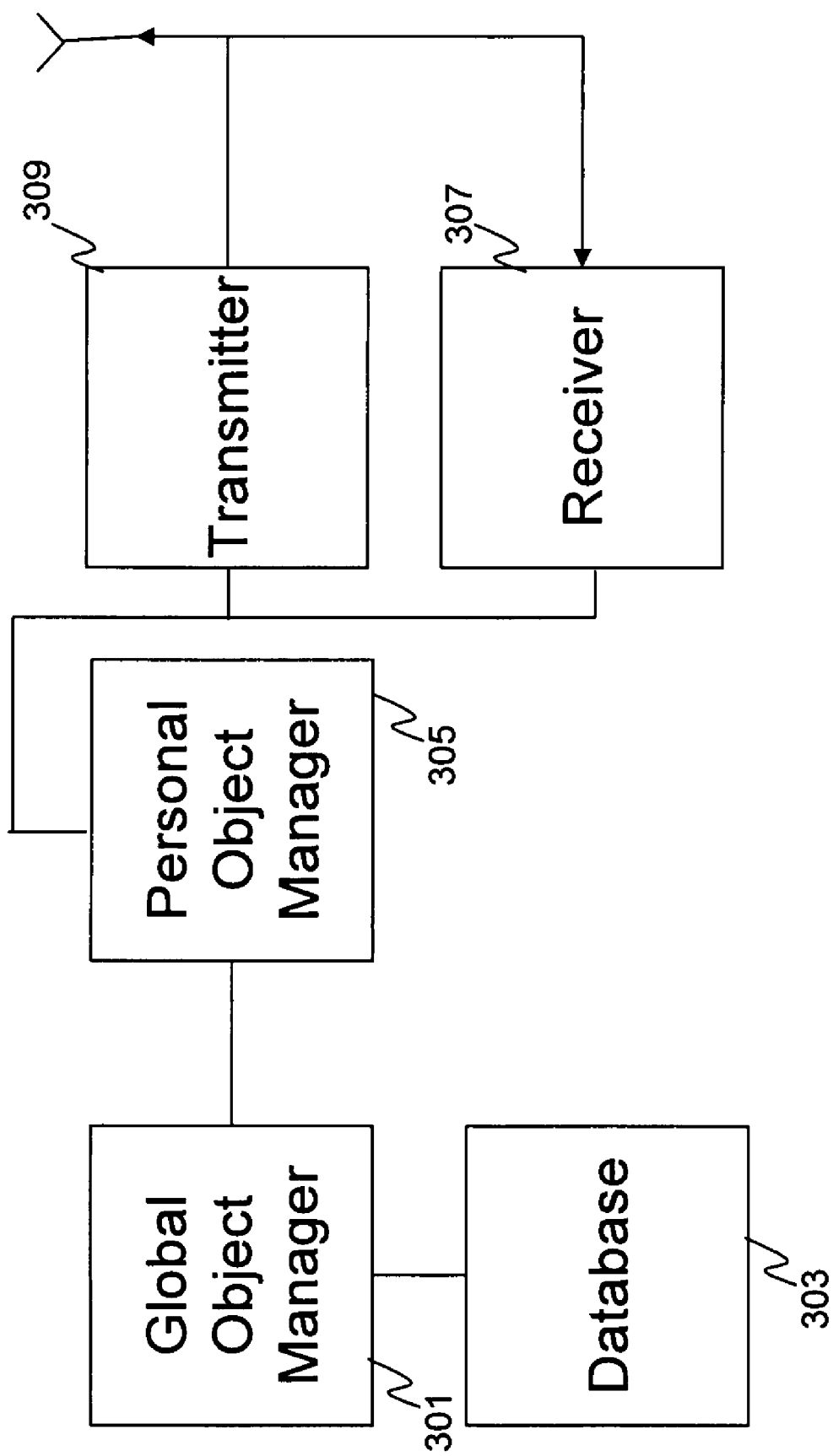
FIG. 3 is a block diagram of the server of FIG. 1.

FIG. 3 is a block diagram of a server of FIG. 1. As is evident, server 101 comprises a global object manager 301, database 303, and personal object manager 305. During operation, global object manager 301 will receive virtual graffiti from any device 105-109 wishing to store graffiti on server 101. This information is preferably received wirelessly through receiver 307. Global object manager 301 is responsible for storing all virtual graffiti existing within system 100. Along with the virtual graffiti, global object manager 301 will also receive a location for the graffiti along with a list of devices that are allowed to display the graffiti. Again, this information is preferably received wirelessly through receiver 307. If the graffiti is to be attached to a particular item (moving or stationary), then the information needed for attaching the virtual graffiti to the object will be received as well. For the first embodiment, a digital representation of a stationary item's surroundings will be stored; for the second embodiment, the physical location of moving or stationary virtual graffiti will be stored. All of the above information is stored in database 303.

Although only one personal object manager 305 is shown in FIG. 3, it is envisioned that each subscriber will have its own personal object manager 305. Personal object manager 305 is intended to serve as an intermediary between its corresponding subscriber and global object manager 301. Personal object manager 305 will periodically receive a location for its corresponding subscriber's device. Once personal object manager 305 has determined the location of the device, personal object manager 305 will access global object manager 301 to determine if any virtual graffiti exists for the particular device at, or near the device's location. Personal object manager 305 filters all available virtual graffiti in order to determine only the virtual graffiti relevant to the particular device and the device's location. Personal object manager 305 then provides the device with the relevant information needed to display the virtual graffiti based on the location of the device, wherein the relevant virtual graffiti changes based on the identity and location of the device. This information will be provided to the device by instructing transmitter 309 to transmit the information wirelessly to the device.

Figure 4:
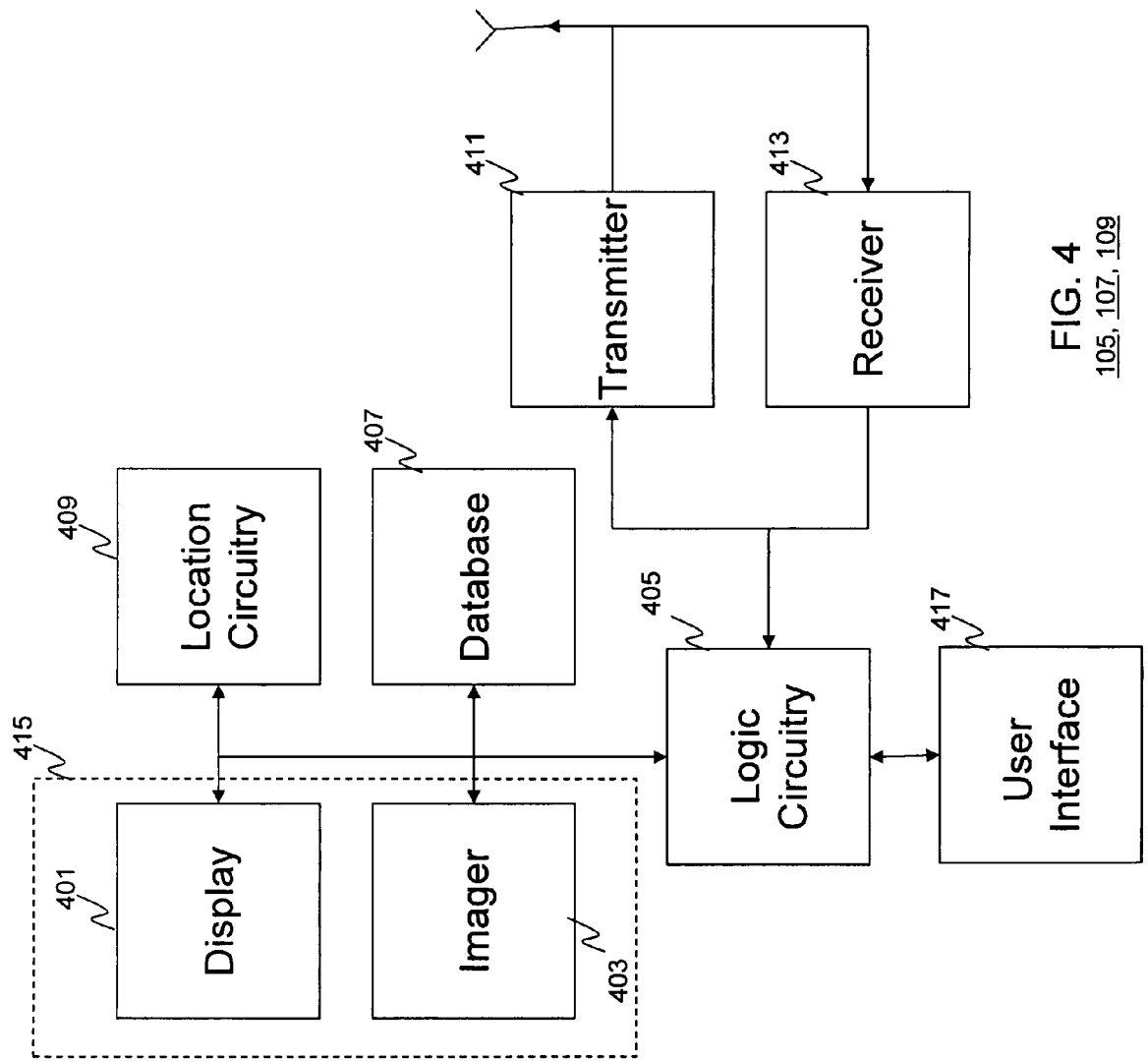
FIG. 4 is a block diagram of the user device of FIG. 1.

FIG. 4 is a block diagram of a user device of FIG. 1. As shown, the user device comprises augmented reality system 415, location circuitry 409, database 407, logic circuitry 405, transmitter 411, receiver 413, and user interface 417. During operation, a user of the device creates virtual graffiti via user interface 417. In one embodiment of the present invention, user interface 417 comprises an electronic tablet capable of receiving and creating handwritten messages and/or pictures. In another embodiment, the handwritten messages, pictures, avatars, . . . etc., are created beforehand and stored in database 407. Once logic circuitry 405 receives the virtual graffiti from user interface 417 or database 407, logic circuitry 405 accesses location circuitry 409 and determines a location where the graffiti was created (for stationary graffiti) or the device to which the virtual graffiti will be attached (for mobile graffiti). Logic circuitry 405 also receives a list of users with privileges to view the graffiti. This list is also provided to logic circuitry 405 through user interface 417.

In one embodiment of the present invention the virtual graffiti is associated with a physical object. When this is the case, logic circuitry 405 will also receive information required to attach the graffiti to an object. Finally, the virtual graffiti is provided to virtual graffiti server 101 by logic circuitry 405 instructing transmitter 411 to transmit the virtual graffiti, the location, the list of users able to view the graffiti, and if relevant, the information needed to attach the graffiti to an object.

As discussed above, server 101 periodically monitors the locations of all devices 105-109 along with their identities, and when a particular device is near a location where it is to be provided with virtual graffiti, server 101 utilizes network 103 to provide this information to the device.

When a particular device is near a location where virtual graffiti is available for viewing, the device will notify the user, for example, by instructing user interface 417 to beep. The user can then use the device to view the virtual graffiti as part of an augmented reality scene. Thus, when the device of FIG. 4 is near a location where virtual graffiti is available for it, receiver 413 will receive the graffiti and the location of the graffiti from server 101. If relevant, receiver 413 will also receive information needed to attach the graffiti to a physical object. This information will be passed to logic circuitry 405 and stored in database 407.

Logic circuitry 405 periodically accesses location circuitry 409 to get updates to its location and provides these updates to server 101. When logic circuitry 405 determines that the virtual graffiti should be displayed, it will notify the user of the fact. The user can then use augmented reality system 415 to display the graffiti. More particularly, imager 403 will image the current background and provide this to display 401. Display 401 will also receive the virtual graffiti from database 407 and provide an image of the current background with the graffiti appropriately displayed. Thus, the virtual graffiti will be embedded in or merged with the user's view of the real-world.

As discussed above, augmented reality system 415 may use vision recognition to attempt to match the originally created virtual graffiti to the user's current environment. When display 401 determines that the user's surroundings match the image of the graffiti's surroundings, the graffiti will be appropriately displayed, for example, attached to a physical object.

Figure 5:
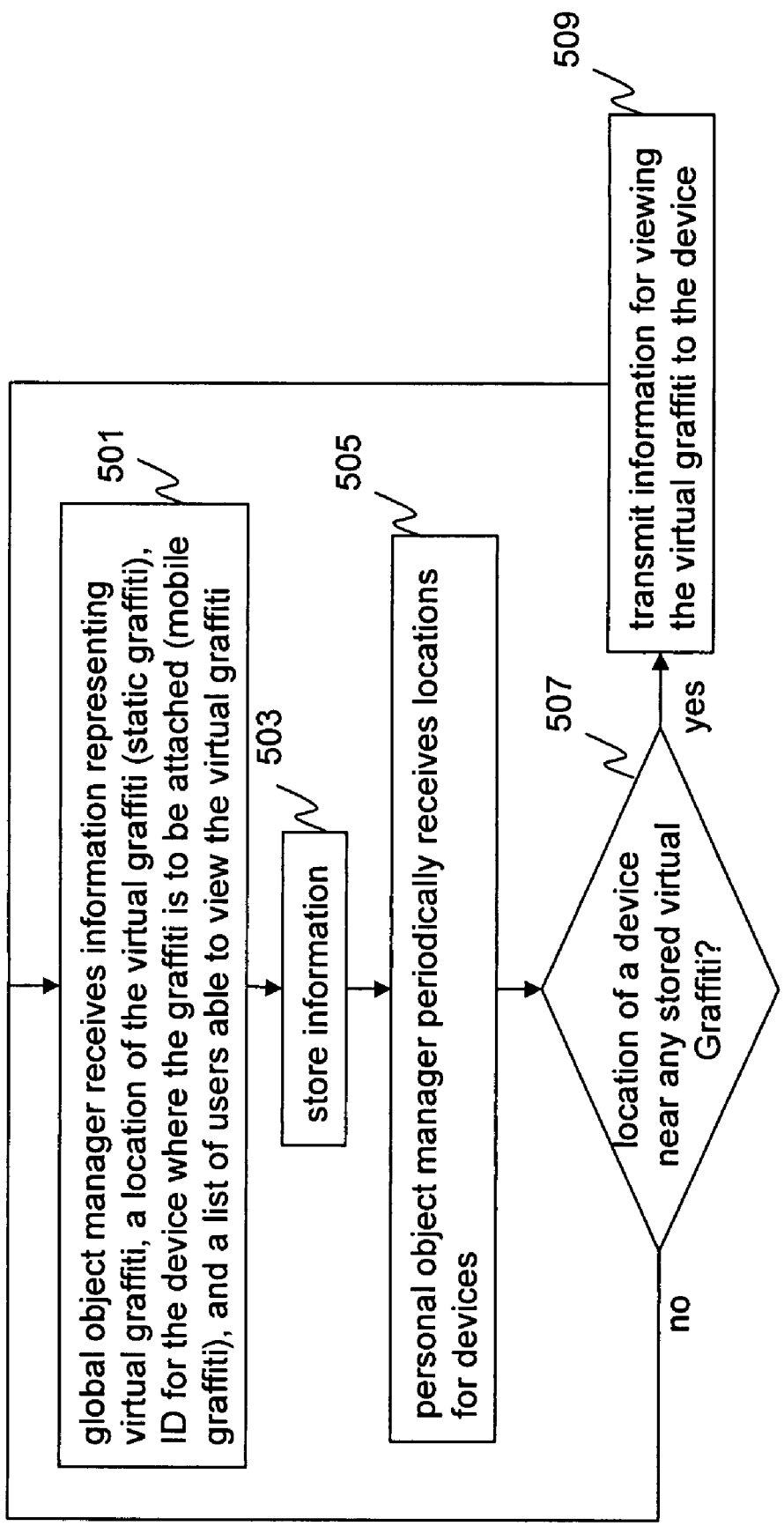
FIG. 5 is a flow chart showing operation of the server of FIG. 1.

FIG. 5 is a flow chart showing operation of the server of FIG. 1. The logic flow begins at step 501 where global object manager 301 receives from a first device, information representing virtual graffiti, a location of the virtual graffiti, and a list of users able to view the virtual graffiti. It should be noted that the information received at step 501 may be updates to existing information. For example, when the virtual graffiti is "mobile", global object manager 301 may receive periodic updates to the location of the graffiti. Also, it is envisioned that periodic updates to the graffiti may be received. For example, a user who receives virtual graffiti may be able to modify the graffiti and then store the modified graffiti on server 101. Multiple users may store multiple versions of the modified graffiti on server 101. Users are allowed to modify any version of the graffiti, no matter whether it is the original version, any intermediate versions, or the latest version. Therefore, a hierarchical relationship among all versions of the graffiti can be established, which can be represented as a tree, with each node representing one version of the graffiti and all its children representing the versions that are directly extended from the current version. Each version of the graffiti is given a unique version number, may contain different attributes (such as locations), and may be available to different lists of users. Users can view multiple versions of the graffiti at the same time and have the freedom to choose any versions for further modification. Once the modification is performed by the user, a new version of the graffiti is created and sent to the server along with its location and a list of users having the privilege to view the graffiti. The new version is then stored on the server and is available to other users of the system.

With the above in mind, a first user can create virtual graffiti to be stored on server 101. Server 101 may, at a later time, receive the virtual graffiti from a second device along with a location of the modified virtual graffiti, wherein the modified virtual graffiti is an updated version of the virtual graffiti. Similarly, a first user may receive virtual graffiti as described above and then modify the virtual graffiti, sending the modified virtual graffiti back to server 101.

Continuing with the logic flow of FIG. 5, information is then stored in database 303 (step 503). As discussed above, personal object manager 305 will periodically receive locations for all devices, including the first device (step 505) and determine if the location of a device is near any stored virtual graffiti (step 507). If, at step 507, personal object manager 305 determines that its corresponding device is near any virtual graffiti that it is able to view, then the logic flow continues to step 509 where the graffiti and the necessary information for viewing the virtual graffiti is wirelessly transmitted to the device via transmitter 309. However, if at step 507, it is determined that the device is not near any virtual graffiti, then the logic flow returns to step 501. As discussed above, the virtual graffiti is restricted as to what device can display the virtual graffiti.

Figure 6:
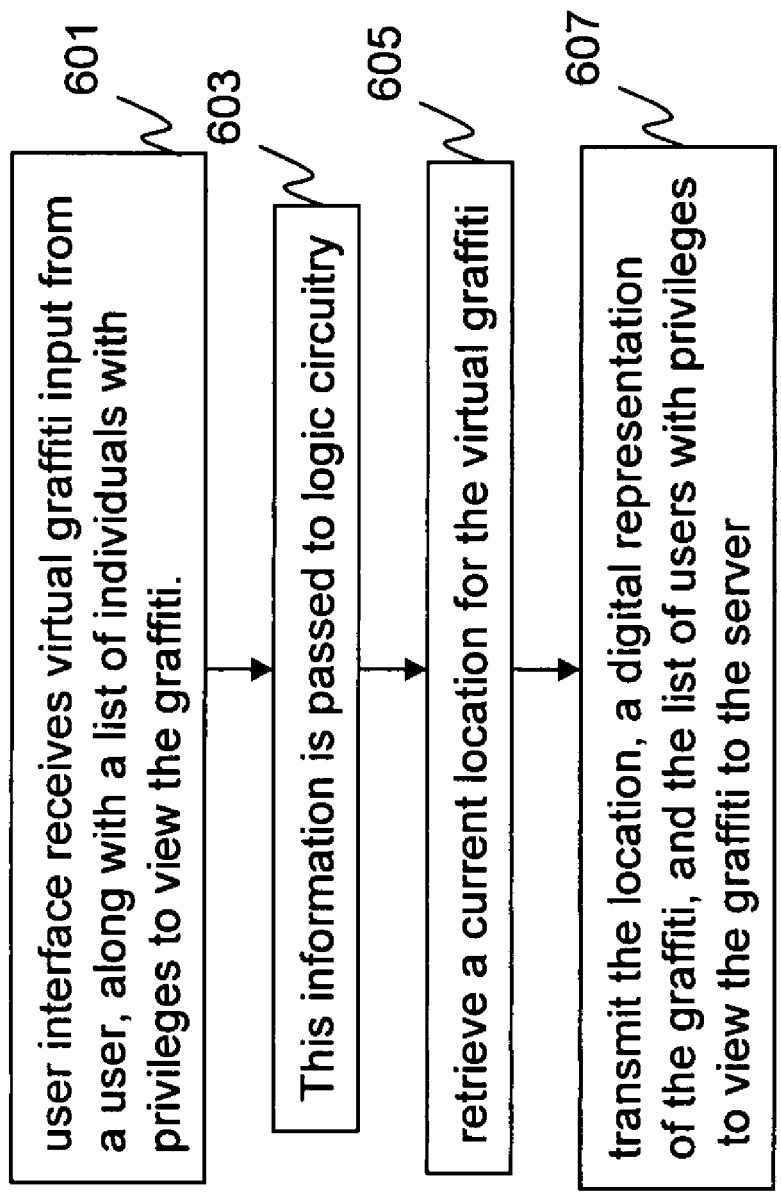
FIG. 6 is a flow chart showing operation of the user device of FIG. 1 when creating static graffiti.

FIG. 6 is a flow chart showing operation of the user device of FIG. 1 when creating static graffiti. In particular, the logic flow of FIG. 6 shows the steps necessary to create virtual graffiti and store the graffiti on server 101 for others to view. The logic flow begins at step 601 where user interface 417 receives virtual graffiti input from a user, along with a list of devices with privileges to view the graffiti. This information is passed to logic circuitry 405 (step 603). At step 605, logic circuitry 405 accesses location circuitry 409 and retrieves a current location for the virtual graffiti. The logic flow continues to step 607 where logic circuitry 405 instructs transmitter 411 to transmit the location, a digital representation (e.g., a .jpeg or .gif image) of the graffiti, and the list of users with privileges to view the graffiti to server 101. It should be noted that in the 3D virtual object case, the digital representation could include URLs to 3D models and content (e.g., photos, music files, etc.).

Figure 7:
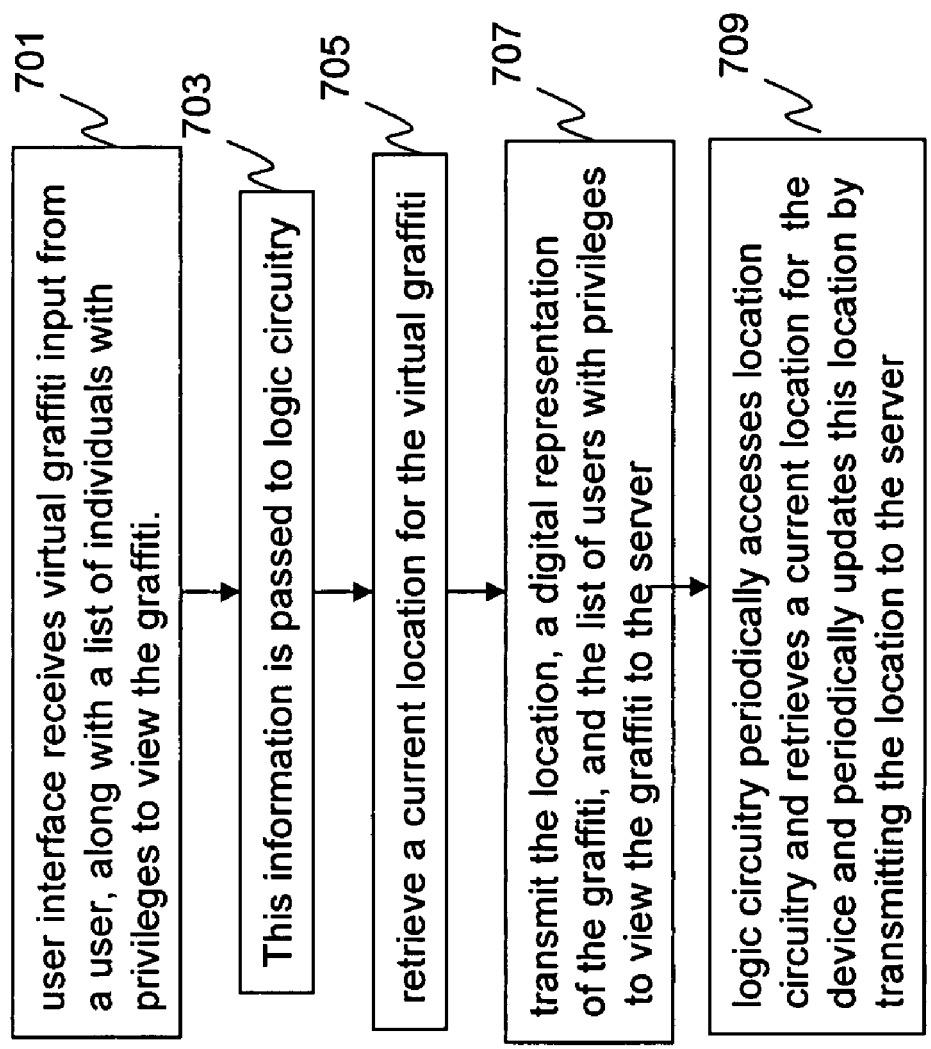
FIG. 7 is a flow chart showing operation of the user device of FIG. 1 when creating non-static graffiti.

FIG. 7 is a flow chart showing operation of the user device of FIG. 1 when creating non-static graffiti (e.g., an avatar attached to the user/device). In particular, the logic flow of FIG. 7 shows the steps necessary to create virtual graffiti that will be attached to the user's device, and store the graffiti on server 101 for others to view. The logic flow begins at step 701 where user interface 417 receives virtual graffiti input from a user, along with a list of devices with privileges to view the graffiti. This information is passed to logic circuitry 405 (step 703). At step 705, logic circuitry 405 accesses location circuitry 409 and retrieves a current location for the device. The logic flow continues to step 707 where logic circuitry 405 instructs transmitter 411 to transmit the location, a digital representation (e.g., a .jpeg or .gif image) of the graffiti, and the list of users with privileges to view the graffiti to server 101. Finally, at step 709 logic circuitry 405 periodically accesses location circuitry 409 and retrieves a current location for the device and periodically updates this location by transmitting the location to server 101. It should be noted that in the preferred embodiment of the present invention the location for the device (and hence the location of the virtual graffiti) is updated only when the device moves in order to save bandwidth. Thus, when the device/virtual graffiti is moving, more frequent updates to the device's location will occur.

Figure 8:
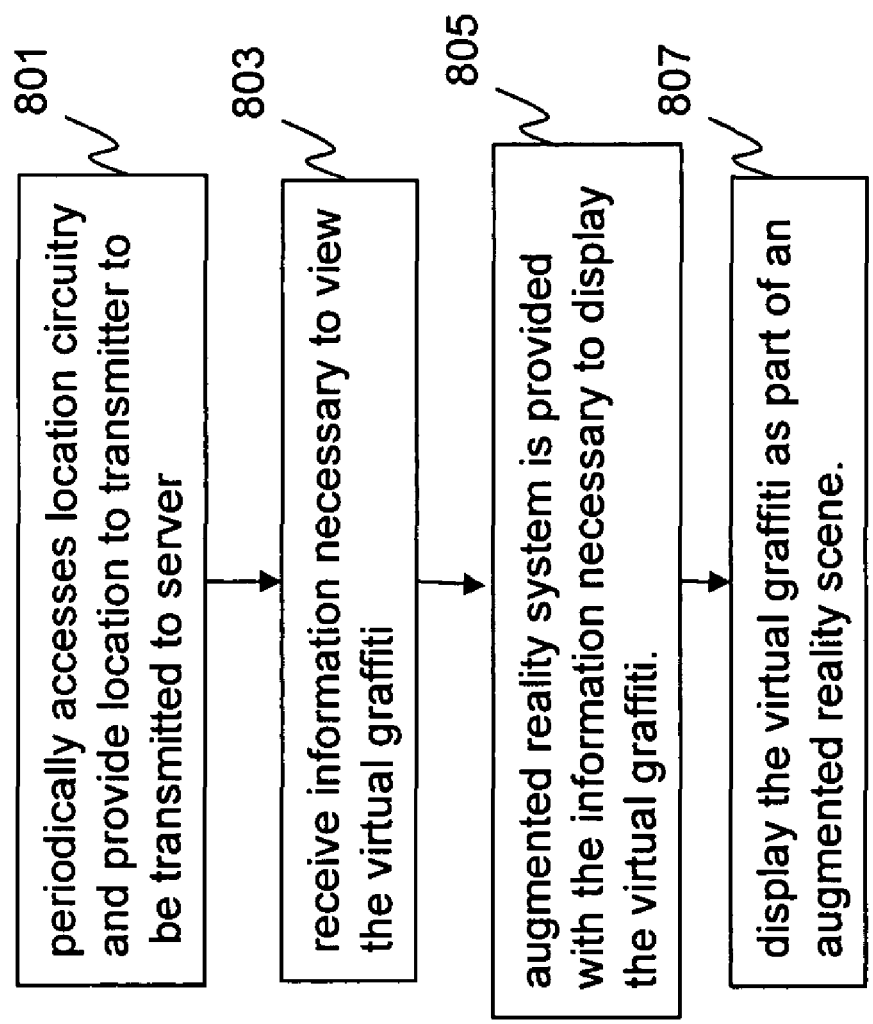
FIG. 8 is a flow chart showing operation of the user device of FIG. 1.

FIG. 8 is a flow chart showing operation of the user device of FIG. 1. In particular, the logic flow of FIG. 8 shows those steps necessary to display virtual graffiti. The logic flow begins at step 801 where logic circuitry 405 periodically accesses location circuitry 409 and provides a location to transmitter 411 to be transmitted to server 101. At step 803, receiver 413 receives information necessary to view the virtual graffiti. As discussed above, this information may simply contain a gross location of the virtual graffiti's location along with a representation of the virtual graffiti. In other embodiments, this information may contain the necessary information to attach the virtual graffiti to an object. Such information may include a digital representation of the physical object, or a precise location of the virtual graffiti. At step 805, logic circuitry 405 accesses augmented reality system 415 and provides system 415 with the information necessary to display the virtual graffiti. For the 3D case, this would include the device's orientation to specify a viewpoint. Finally, at step 807, display 401 displays the virtual graffiti as part of an augmented reality scene.

While the invention has been particularly shown and described with reference to particular embodiments, it will be understood by those skilled in the art that various changes in form and details may be made therein without departing from the spirit and scope of the invention.

The invention claimed is:

1. An apparatus comprising:
a global object manager wirelessly receiving from a first mobile device, mobile virtual graffiti, the location of the first mobile device, and a list of devices with privileges to view the mobile virtual graffiti;
a database storing the mobile virtual graffiti, the location of the first mobile device, and the list of devices with privileges to view the mobile virtual graffiti;
a personal object manager periodically receiving locations from the devices with privileges to view the mobile virtual graffiti, periodically receiving a location of the first mobile device, and determining that a second mobile device is near the location of the first mobile device, wherein the second mobile device is on the list of devices with privileges to view the mobile virtual graffiti; and a transmitter wirelessly providing the second mobile device with the mobile virtual graffiti when it is determined that the second mobile device is near the location of the first mobile device, wherein the mobile virtual graffiti is assigned to an object that is mobile.

2. The apparatus of claim 1 wherein the mobile virtual graffiti comprises an avatar.

3. The apparatus of claim 1 wherein the mobile virtual graffiti comprises information about a user of the first device.

4. A method comprising the steps of:
wirelessly receiving from a first mobile device, mobile virtual graffiti, the location of the first mobile device, and a list of devices with privileges to view the mobile virtual graffiti;

storing the mobile virtual graffiti, the location of the first mobile device, and the list of devices with privileges to view the mobile virtual graffiti;

periodically receiving locations from the devices with privileges to view the mobile virtual graffiti;

periodically receiving a location of the first mobile device;

determining that a second mobile device is near the location of the first mobile device, wherein the second mobile device is on the list of devices with privileges to view the mobile virtual graffiti; and wirelessly providing the second mobile device with the mobile virtual graffiti when it is determined that the second mobile device is near the location of the first mobile device, wherein the mobile virtual graffiti is assigned to an object that is mobile.

5. The method of claim 4 wherein the mobile virtual graffiti comprises an avatar.

6. The method of claim 4 wherein the mobile virtual graffiti comprises information about a user of the first device.

* * * * *